(12) United States Patent
Garcia et al.

(10) Patent No.: US 6,758,371 B1
(45) Date of Patent: Jul. 6, 2004

(54) FAST RATE PUMP

(75) Inventors: Firmin Garcia, Evreux (FR); Aline Abergel, Boulogne (FR)

(73) Assignee: Valois S.A., Le Neubourg (FR)

( * ) Notice: Subject to any disclaimer, the term of this patent is extended or adjusted under 35 U.S.C. 154(b) by 59 days.

(21) Appl. No.: 10/129,840

(22) PCT Filed: Nov. 8, 2000

(86) PCT No.: PCT/FR00/03110

§ 371 (c)(1),
(2), (4) Date: Aug. 26, 2002

(87) PCT Pub. No.: WO01/34307

PCT Pub. Date: May 17, 2001

(30) Foreign Application Priority Data

Nov. 12, 1999 (FR) .......................................... 99 14234

(51) Int. Cl.[7] ................................................ B67D 5/08
(52) U.S. Cl. ........................ 222/52; 222/207; 222/249; 222/380
(58) Field of Search ........................ 222/52, 206–215, 222/249, 321.2, 321.6, 383.1, 380, 634

(56) References Cited

U.S. PATENT DOCUMENTS

| | | | | |
|---|---|---|---|---|
| 4,917,265 A | * | 4/1990 | Chiang | 222/52 |
| 5,320,250 A | * | 6/1994 | La et al. | 222/1 |
| 6,209,751 B1 | * | 4/2001 | Goodin et al. | 222/52 |
| 6,293,428 B1 | * | 9/2001 | Chen | 222/55 |

* cited by examiner

Primary Examiner—Gene Mancene
Assistant Examiner—M A Cartagena
(74) Attorney, Agent, or Firm—Sughrue Mion, PLLC

(57) ABSTRACT

The invention concerns a dispensing device comprising a fluid product pump (1) defining: a pump chamber (112) with variable volume; an intake valve (14) allowing the fluid product to penetrate into the pump chamber; and an outlet valve (16) allowing the pressurized fluid to exit from the chamber; a dispensing orifice (195) downstream the outlet valve, and the outlet valve comprising a valve seat (126) and a mobile valve member (16) elastically stressed on said seat. The invention is characterized in that the mobile valve member (16) forms piston means for delivering the fluid product downstream towards the dispensing orifice.

11 Claims, 3 Drawing Sheets

FAST RATE PUMP

The present invention relates to a fluid dispenser device serving to be mounted on a receptacle containing the fluid to be dispensed. The invention relates more particularly to a dispenser comprising a fluid pump defining a pump chamber of variable volume, an inlet valve making it possible for the fluid to enter into the pump chamber, an outlet valve making it possible for the fluid under pressure to exit from the chamber, and a dispensing orifice downstream from the outlet valve. This is an entirely conventional design for a dispenser that can, for example, be used in the fields of perfumes, of cosmetics, or of pharmaceuticals.

The present invention relates more specially to the outlet valve of the dispenser. Such an outlet valve conventionally comprises a valve seat and a moving valve member serving to come into leaktight abutment against the valve seat. The moving valve member lifts off its seat when the pressure inside the chamber exceeds a certain threshold. The fluid under pressure inside the chamber can then be delivered through the valve to the dispensing orifice. The pressure threshold for opening the outlet valve is in general determined by thrust means that press the moving valve member against its seat. The thrust means can, for example, be in the form of a spring, which can be a cylindrical or spiral metal spring, or else a plastics spring in any shape whatsoever.

The moving valve member is, in general, a passive member in that it does not participate directly in delivering the fluid to the dispensing orifice. On the contrary, the moving valve member serves merely as a stopper to close off the pump chamber when the pressure inside the chamber is lower than the predetermined pressure threshold. As soon as the pressure exceeds said threshold, the moving valve member moves off its seat and the fluid can flow between the seat and the moving valve member to the dispensing orifice. The delivered fluid thus flows on either side of or all around the moving valve member. It can thus be said that the moving valve member is totally passive during dispensing of the fluid. And, as soon as dispensing is finished, the moving valve member returns to its leaktight position on its seat.

An object of the present invention is to define a dispenser whose outlet valve has a moving valve member that participates actively in dispensing the fluid through the dispensing orifice. In other words, the moving valve member acts directly on the fluid to improve the dispensing.

To achieve this object, the present invention provides a dispenser whose outlet valve comprises a valve seat and a moving valve member urged resiliently against said seat, the moving valve member forming piston means for delivering the fluid situated downstream towards the dispensing orifice. The moving valve member thus no longer merely lifts off its seat to allow the fluid past, but rather it actively delivers the fluid situated downstream from it towards the dispensing orifice. Thus, the fluid dispensed is not the fluid delivered from the pump chamber but rather the fluid situated in the valve chamber downstream from the moving valve member, which, when it moves, pushes the fluid through the dispensing orifice.

In an embodiment, the moving valve member is received in a valve chamber in which it moves with a small amount of clearance. Preferably, the valve chamber defines a cylindrical inside wall and the moving valve member comprises a cylindrical disk of diameter slightly smaller than the diameter of the chamber so that the peripheral edge of the disk moves with a very small mount of clearance relative to the cylindrical wall.

In another embodiment, the valve chamber defines a cylindrical inside wall provided with ribs and the moving valve member comprises a cylindrical disk having a peripheral edge in sliding contact with the ribs. The ribs define passageways between them through which the fluid can flow to go around the disk. However, as in the preceding embodiment in which the disk has a very small amount of clearance between itself and the wall of the chamber, very large head loss is generated at the periphery of the disk so that the fluid delivered from the chamber tends to displace the disk rather than flowing around it through the small amount of clearance or through the passageways defined by the ribs. The fluid delivered from the pump chamber does not pass directly to the other side of the moving valve member because of the passageway of small cross-section that it encounters at the edges of the moving valve member. Thus, the fluid comes to push the moving valve member which, itself, pushes the fluid towards the dispensing orifice. Therefore, the disk is moved very rapidly in response to the arrival of fluid under pressure, since only a very small amount of fluid can escape around the disk. There is thus no or very little damping effect in the displacement of the disk due to the fluid leaking around the disk. In this way, the disk, and more generally the moving valve member perform a hydraulic piston function by delivering the fluid situated downstream to the immediate vicinity of the dispenser. This applies although the disk is not in leaktight contact in the chamber.

In another embodiment, the moving valve member is in leaktight sliding contact in the chamber except at grooves enabling the fluid to pass towards the dispensing orifice when the mobile valve member is at the end of its stroke going away from its seat. Advantageously, the moving valve member is in sliding contact in a sleeve situated in the chamber. In which case, the sleeve defines the grooves. The moving valve member is in leaktight sliding contact with the wall of the sleeve or of the valve chamber over most of its stroke. At the end of its stroke, one or more grooves make it possible for the fluid delivered from the pump chamber to pass to the other side of the moving valve member. In which case, the disk performs a genuine piston function until it reaches the grooves. Therebeyond, the fluid that has pushed the disk can escape into the valve chamber around the disk through the grooves.

Advantageously, the dispenser device further comprises fast rate actuating means suitable for causing the volume of the pump chamber to vary rapidly and repetitively so as to generate, at the dispensing orifice, a substantially continuous jet of fluid. The use of an outlet valve as defined above in combination with fast rate actuating means is very advantageous since each time the pump chamber is actuated, the actuating takes the form of a sudden pulse which causes the moving member to react very rapidly. In addition, these sudden pulses generated by the fast rate actuating means minimize the quantity of fluid that flows around the moving valve member. It is only once the pulse has died down that the moving valve member returns to its leaktight position on its seat, thereby causing the fluid initially situated immediately behind it to pass around it to a point downstream from it, i.e. between itself and the dispensing orifice.

According to another characteristic of the invention, the pump chamber includes a wall in the form of a deformable flexible membrane on which the actuating means act.

According to another characteristic, the pump chamber, the inlet valve, the outlet valve, and the dispensing orifice are part of a first subassembly provided with fixing means for fixing to a receptacle. In addition, the actuating means are part of a second subassembly mounted removably on the first subassembly. Advantageously, the dispensing orifice is fixed relative to a reservoir on which the pump is mounted. In another embodiment, the first subassembly comprises a body and a piece connected to said body to form said pump chamber together, the piece forming the membrane. Preferably, said piece receives the outlet valve and the dispensing orifice.

By using a deformable flexible membrane instead of a sliding piston, the friction forces at the pump chamber are totally eliminated. The force necessary to deform the membrane can be set at a very low level by acting, for example, on the thickness of the membrane. The easier the membrane is to deform, the less the actuating means need to be powerful. It is thus possible to implement a dispensing device that has a very small volume. A principle of the present invention is to minimize or even eliminate the friction forces at the pump.

It should be noted that, unlike in the abovementioned prior art dispenser devices, the dispensing orifice is fixed relative to a reservoir on which the pump is mounted. It is thus possible to obtain a continuous and properly localized jet of fluid.

The invention is described more fully below with reference to the accompanying drawings which give an embodiment of the present invention by way of non-limiting example.

The present invention is explained with reference to a fast rate dispenser. However, it should be understood that the outlet valve of the invention may be implemented on some other type of manual or mechanical dispenser. But implementing it in a fast rate dispenser offers the advantages described above.

Figure 2:
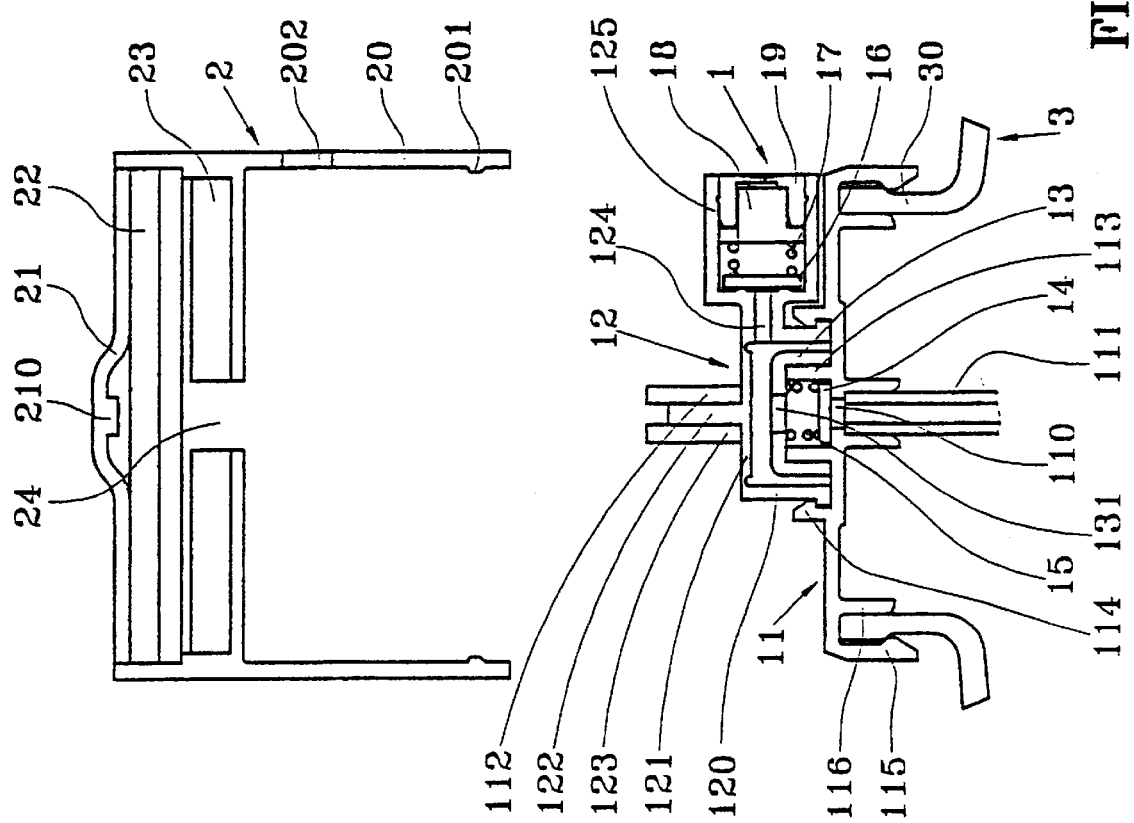
FIG. 2 is an exploded view of the dispenser device of FIG. 1, as mounted on the neck of a receptacle.

Reference is made firstly to FIG. 2 which is an exploded view that shows more clearly all of the component elements of the dispenser device of the invention.

It can be broken down into two subassemblies 1 and 2, the first subassembly 1 comprising a pump, and the second subassembly 2 comprising actuating means. In the invention, the second subassembly 2 is connected to the first subassembly 1 in removable manner, e.g. by snap-fastening, as explained below.

Figure 1:
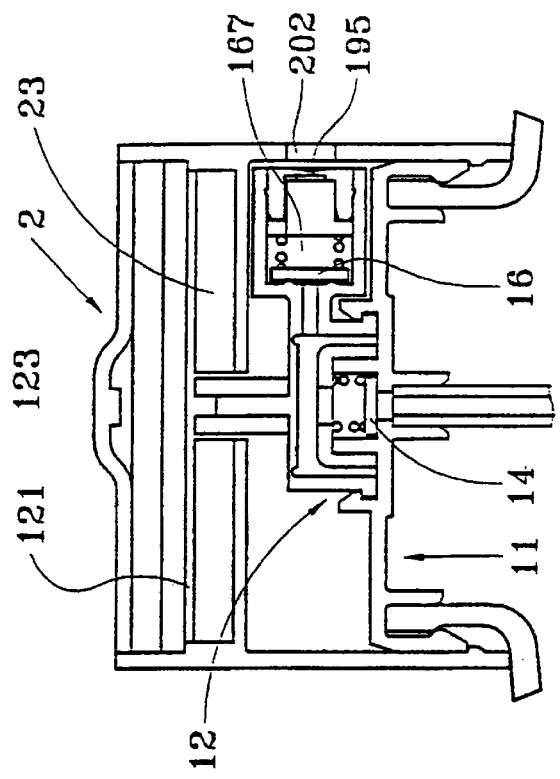
FIG. 1 is a section view through a dispenser device of the invention as mounted on the neck of a receptacle.

The first subassembly 1 is fixed to the neck 30 of a receptacle which is shown in part only in FIGS. 1 and 2. This fixing may be achieved by snap-fastening as shown in the figures, but other techniques, such as screw-fastening or crimping are also possible. More precisely, the first subassembly comprises a body 11 and a separate piece 12 mounted on the body 11. The snap-fastening means for snap-fastening to the neck 30 of the receptacle consist of a peripheral skirt 115 at the end of which a snap-fastening bead is formed that projects inwards so as to come to be received under the thickened rim of the neck 30. The neck 30 of the receptacle may be sealed by means of a self-sealing lip 116 which is in the form of a flange that comes into leaktight contact with the inside edge of the neck 30. The body 11 also defines an inlet opening 110 around which a connection sleeve can extend for a dip tube 111. Around the inlet opening 110, a bushing 113 extends that defines an inlet valve chamber in part. To complete this inlet valve chamber, the bushing 113 is capped by a cup 13 provided with a through hole 131. Inside the chamber formed in this way by the bushing 113 and by the cup 13, an inlet valve member 131 is received that is in the form of a washer urged resiliently by a spring 15 against the inlet opening 110 so as to close it off in leaktight manner. The body 11 also defines a snap-fastening rim 114 which co-operates with the separate piece. The coupling between the separate piece 12 and the body 11 is leaktight where they are snap-fastened together, and they thus together define a pump chamber 112 which communicates with the receptacle 3 via the dip tube 111 and via the inlet opening 110 when the valve 131 is open. The separate piece 12 extends around the cup 13 with a peripheral wall 120 whose bottom end forms a snap-fastening profile that co-operates with the snap-fastening rim 114 of the body 11. This peripheral wall 120 may be cylindrical in shape, and its top end is closed by a wall which, in the invention, is in the form of a deformable flexible membrane 121. The peripheral wall 120 and the flexible membrane 121 cooperate with the body 11 to form a pump body 112. This chamber 112 is closed off at the inlet 110 by the bottom moving valve member 14. The chamber 112 also has an outlet 124 which is closed off by a moving valve member 16 that is urged resiliently by a spring 16 against a seat 126. The outlet duct 124 and the seat 126 are formed by the separate piece 12. The separate piece 12 also forms a recesss 125 in which the moving valve member 16 is received, as is the spring 17 and also a spray nozzle core 18 and a spray nozzle 19. In the embodiment shown in FIGS. 1, 2, and 3, the spray nozzle has a single outlet orifice 195 which, together with the core 18, forms swirl channels 192 and a swirl chamber 194. The core 18, together with the moving valve member 16 and the side walls of the recess 125, forms an outlet valve chamber 167 in which the fluid is stored. It should be noted that the dispensing orifice 195 and the recess 125 are fixed relative to the receptacle, unlike the dispensing head in the above-mentioned prior art document. The only moving member of the piece 12 is the deformable flexible membrane 121. To actuate this membrane 121, an actuating appendage 122 is provided that is advantageously formed integrally with the piece 12. In the embodiment shown in the figures, the appendage 122 includes a plunger 123 serving to co-operate with a solenoid 23 that is part of the second subassembly 2.

The second subassembly 2 is in the form of a cap having a body 20 in which the solenoid 23 is received, the electronics necessary to operate the solenoid 23 and a battery in the form of a changeable primary cell. At its top end, the second sub-assembly 2 forms a pusher 21 for establishing electrical contact and thus for activating the solenoid 23. Like any solenoid, the solenoid 23 has a central recess 24 in which the plunger 123 of the first subassembly 1 can move back and forth when the solenoid 23 is powered. Thus, the deformable flexible membrane 21 can be deformed rapidly and repetitively as the plunger 23 moves back and forth in the solenoid 23. In the invention, the second subassembly 2 is mounted on the first subassembly 1 by snap-fastening; to this end, the bottom end of the body 20 is provided with snap-fastening projections 201 serving to co-operate with the outer skirt 115 formed by the body 11 of the first subassembly 1, as can be seen in FIG. 1. Preferably, the second subassembly 2 is snap-fastened in removable manner to the first subassembly 1 so that it can be removed, thereby enabling it to be re-used. The second subassembly 2 contains relatively costly electronics, whereas the first subassembly 1 is essentially made up of parts made of molded plastic and therefore of relatively low cost. Therefore, once the receptacle 3 is empty, the receptacle can be discarded with the first subassembly 1 mounted on it, while the second subassembly 2 is kept.

Although the solenoid and an associated plunger are used to illustrate the present invention, it is possible to imagine other actuating means, e.g. means that are purely mechanical with a motor.

Such a dispenser device is particularly simple to operate. By pressing on the pusher 21, electrical contact is established, and the solenoid 23 is powered. This actuates the plunger 123 which is connected to the appendage 122 so that the membrane 121 is rapidly deformed. When the plunger 123 rises, the bottom valve 14 opens and the top valve 16 closes, whereas when the plunger 123 descends, the bottom valve 14 closes and the top valve 16 opens. Since there is no friction force in such a pump, the power of the solenoid 23 can be extremely low, as can its power supply (battery) so that the second subassembly 2 can be of particularly small dimensions.

Figure 3A:
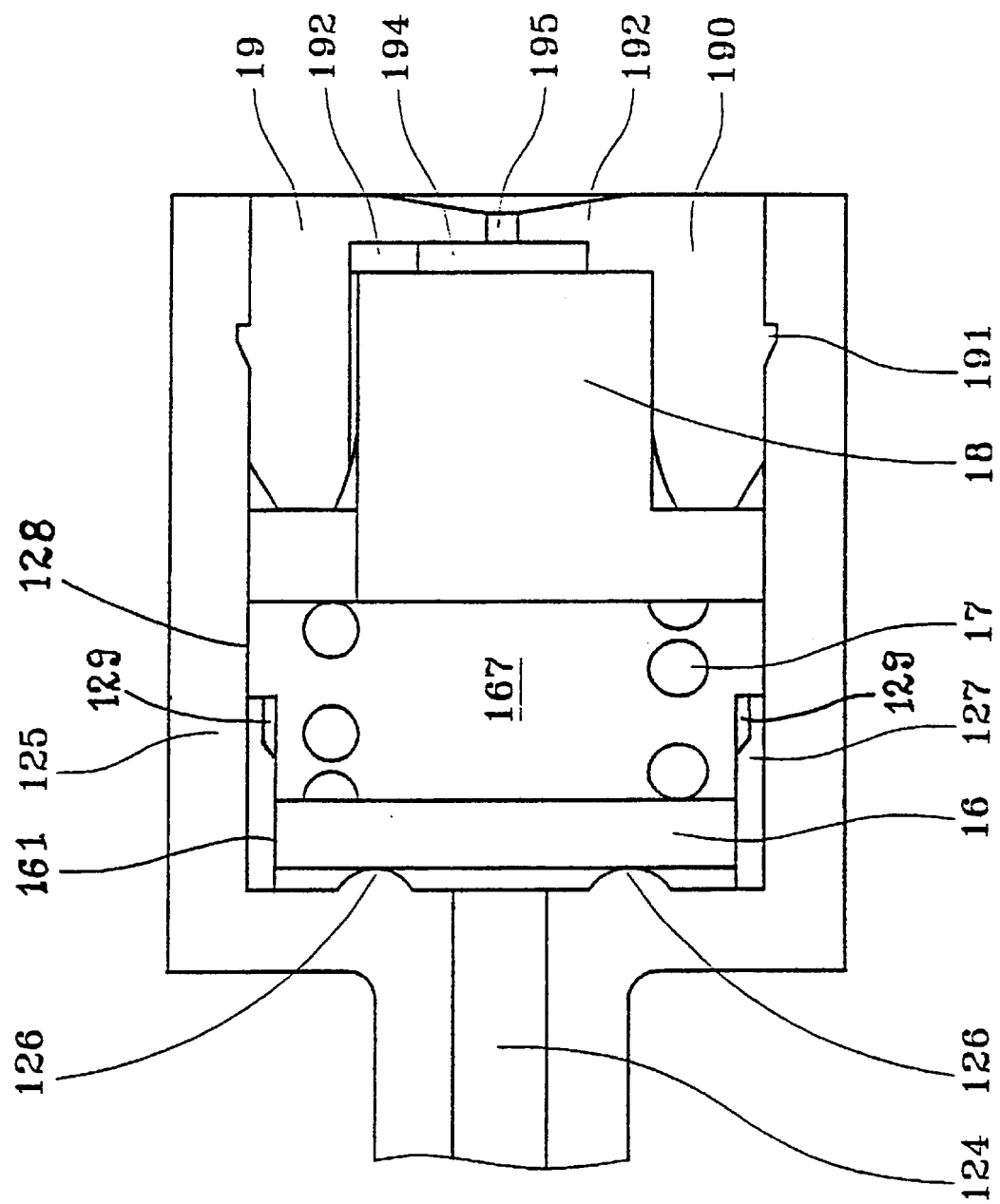
FIG. 3A is a section view through an outlet valve in a first embodiment.
Figure 3B:
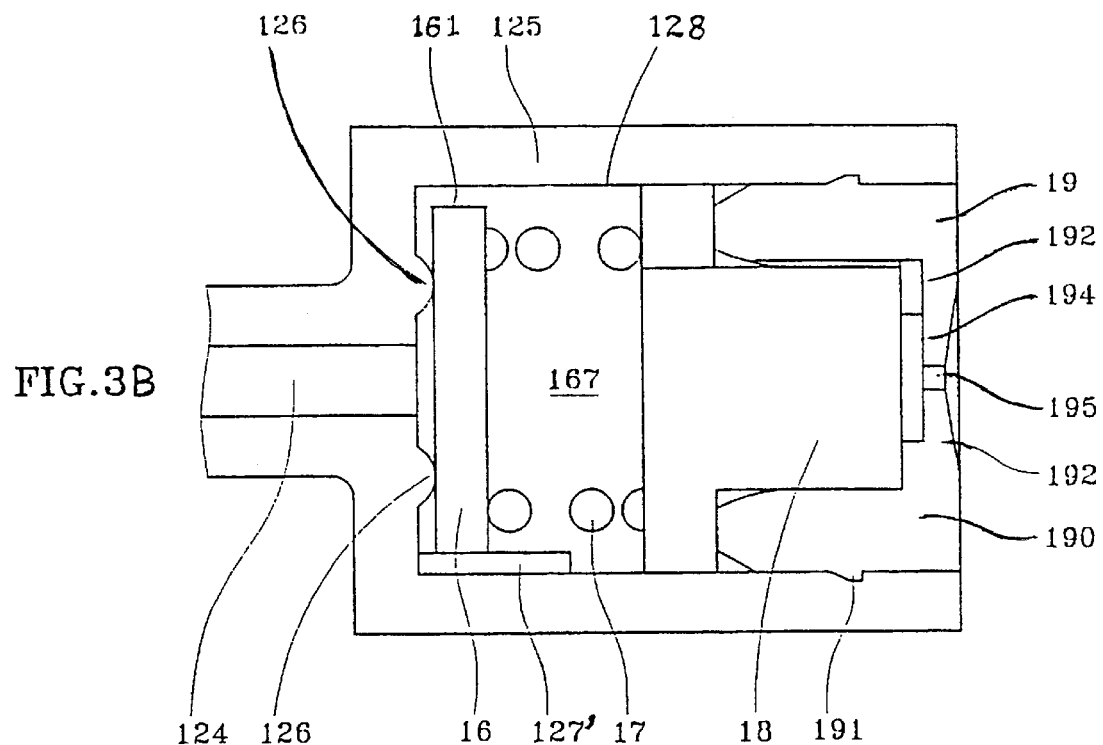
FIG. 3B is a section view through an outlet valve in a second embodiment.
Figure 4:
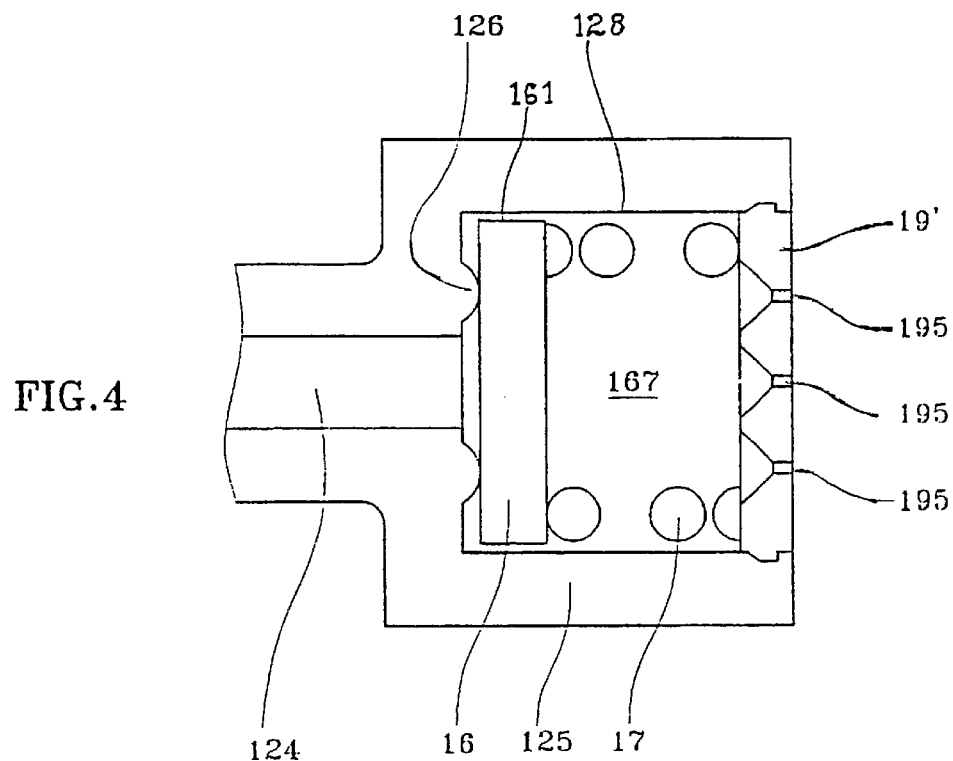
FIG. 4 is a view similar to the view shown in FIG. 3, for a third embodiment of an outlet valve.

Reference is made below to FIGS. 3A, 3B, and 4 to explain the structure and operation of the outlet valve 16 of the device of the invention. It should be noted that the outlet valve may be used in other types of pump, and not only in fast rate pumps, although a preferred use for it is in such pumps.

In the invention, in addition to performing the function of selectively closing off the outlet channel 124, the moving valve member 16 also performs an additional function as piston means for delivering the fluid stored in the valve chamber 167 towards the outlet orifice 195. After being used for the first time, the valve chamber 167 is filled with fluid. By powering the solenoid by pressing on the pusher 21, the membrane 121 is deformed, thereby delivering fluid through the outlet duct 124. The fluid under pressure arrives against the moving valve member and lifts it off its seat 126. For this purpose, the moving valve member moves in translation towards the dispensing orifice 195. During this movement in translation, the moving piston member 16 displaces the fluid stored in the chamber 167. Therefore, the fluid that arrives under pressure in the outlet channel 124 is not the fluid that is dispensed via the outlet orifice 195, but rather it is the fluid that is temporarily stored in the valve chamber 167. When the moving valve member 16 returns to its position in which it is in leaktight contact against the seat 126, the fluid present between it and the seat 126 is delivered into the top valve chamber 167 because the moving valve member is urged by the spring 17. The next time that fluid under pressure arrives in the outlet channel 124, the same process is repeated: the fluid pushes the moving valve member which itself pushes the fluid stored in the chamber 167 towards the orifice 195. When the valve member returns to its seat, the fluid situated upstream passes into the chamber 167.

This function as piston means that is performed by the moving valve member 16 is possible because of its configuration inside the chamber 167. The chamber 167 defines a cylindrical inside wall 128, and the moving valve member 16 is in the form of a disk whose diameter is only very slightly smaller than the diameter of the recess 125 so that the clearance between the peripheral edge 161 of the disk 16 and the wall 128 of the chamber 167 is very small. The disk 16 thus moves inside the chamber 167 with a very small amount of clearance, so that the fluid under pressure encounters resistance to flow at said clearance. This is shown in FIG. 4.

It is also possible to imagine an embodiment in which the washer 16 comes into leaktight sliding contact against the inside wall of the chamber over a portion of its stroke, where the contact is, for example, interrupted by pieces in relief 129 formed in the inside wall of the recess 125. In this solution, the piston 16 then literally performs the function of a piston. This is shown in FIG. 3A in which it can be seen that the peripheral edge 161 of the disk 16 comes into leaktight contact in a sleeve 127 which, at its downstream end is provided with grooves 129 via which the fluid can flow past when the disk is at the end of its stroke.

In a variant, the pieces in relief may extend over the entire length of the sleeve so as to define ribs and grooves even when the disk is in leaktight abutment against its seat 126. The ribs formed by the sleeve 127 then serve as guide means to guarantee that the disk moves in translation in the chamber.

It is possible to imagine another version shown in FIG. 3B, in which the peripheral edge 161 of the disk 16 is in contact with the ribs 127' distributed circumferentially around the wall 128 of the chamber. Between the ribs, the clearance between the edge 161 of the disk and the wall 128 of the chamber 167 is very small. For example, it is possible to provide three ribs at the most that advantageously serve as guide means, like the ribs of the sleeve 127 of FIG. 3A.

FIGS. 3A and 3B show a single dispensing orifice 195 upstream from which swirl channels 192 are formed as is a swirl chamber 194. Thus, the jet of fluid dispensed at the outlet of the orifice 95 is a continuous jet of sprayed fluid.

In the embodiment shown in FIG. 4, the spray nozzle is formed by a spray nozzle plate 19' provided with a plurality of dispensing orifices 195. The dispensing of the fluid is then more spread out.

What is claimed is:

1. A dispenser device comprising a fluid pump (1) defining:
   a pump chamber (112) of variable volume;
   an inlet valve (14) making it possible for the fluid to enter into the pump chamber;
   an outlet valve (16) making it possible for the fluid under pressure to exit from the chamber;
   a dispensing orifice (195) downstream from the outlet valve; and
   the outlet valve comprising a valve seat (126) and a moving valve member (16) urged resiliently against said seat;
   said dispenser device being characterized:
   in that the moving valve member (16) forms piston means for delivering the fluid situated downstream towards the dispensing orifice, the moving valve member (16) being received in a valve chamber (167) in which it moves with a small amount of clearance; and
   in that fast rate actuating means (2) are provided to cause the volume of the pump chamber to vary rapidly and repetitively so as to displace the moving valve member in order to generate, at the dispensing orifice, a substantially continuous jet of fluid.

2. A device according to claim 1, in which the valve chamber defines a cylindrical inside wall (128) and the moving valve member comprises a cylindrical disk (16) of diameter slightly smaller than the diameter of the chamber so that the peripheral edge (161) of the disk moves with a very small amount of clearance relative to the cylindrical wall (128).

3. A device according to claim 1, in which the valve chamber defines a cylindrical inside wall (128) provided with ribs (127') and the moving valve member comprises a cylindrical disk (16) having a peripheral edge (161) in sliding contact with the ribs (127').

4. A device according to claim 1, in which the moving valve member (16) is in leaktight sliding contact in the chamber (167) except at grooves (129) enabling the fluid to pass towards the dispensing orifice when the mobile valve member is at the end of its stroke going away from its seat (126).

5. A device according to claim 4, in which the moving valve member is in sliding contact in a sleeve (127) situated in the chamber (167).

6. A device according to claim 5, in which the sleeve defines the grooves (129).

7. A device according to claim 6, in which the first subassembly (1) comprises a body (11) and a piece (12) connected to said body to form said pump chamber (112) together, the piece (12) forming the membrane (121).

8. A device according to claim 1, in which the pump chamber includes a wall in the form of a deformable flexible membrane (121) on which the actuating means act.

9. A device according to claim 1, in which the pump chamber (112), the inlet valve (14), the outlet valve (16), and the dispensing orifice (195) are part of a first subassembly (1) provided with fixing means (115) for fixing to a receptacle (3).

10. A device according to claim 1, in which the dispensing orifice is fixed relative to a reservoir on which the pump is mounted.

11. A device according to claim 9, in which said piece (12) receives the outlet valve (16) and the dispensing orifice (195).

* * * * *